Dec. 23, 1958 J. B. McKINLEY ET AL 2,865,868
PROCESS FOR PREPARING IMPREGNATED COMPOSITE CATALYSTS
Filed April 4, 1952 3 Sheets-Sheet 1

INVENTORS.
Joseph B. McKinley, Benjamin P. Thomas and
Michael J. Derrig.
By C. P. M. Houghton
their ATTORNEY.

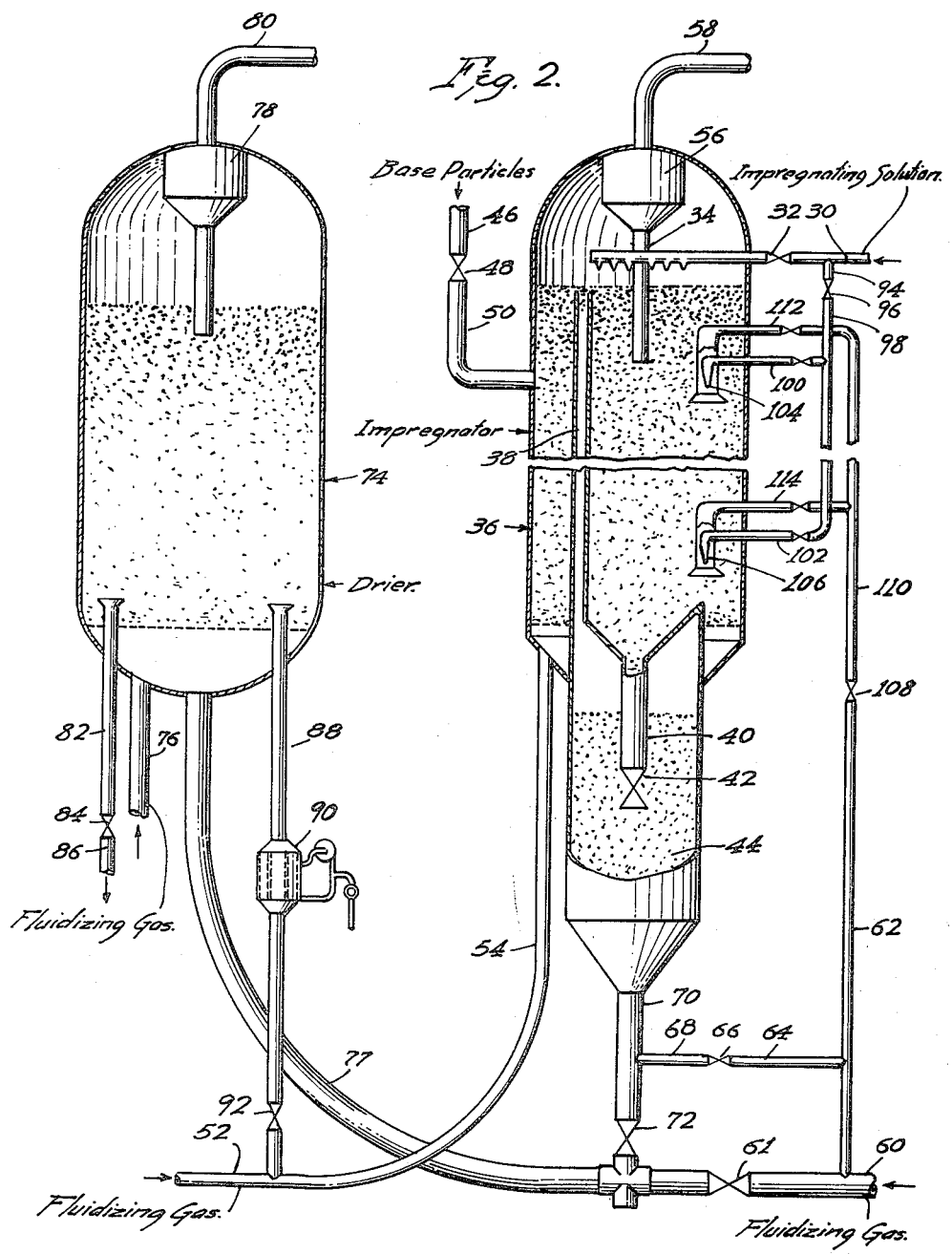

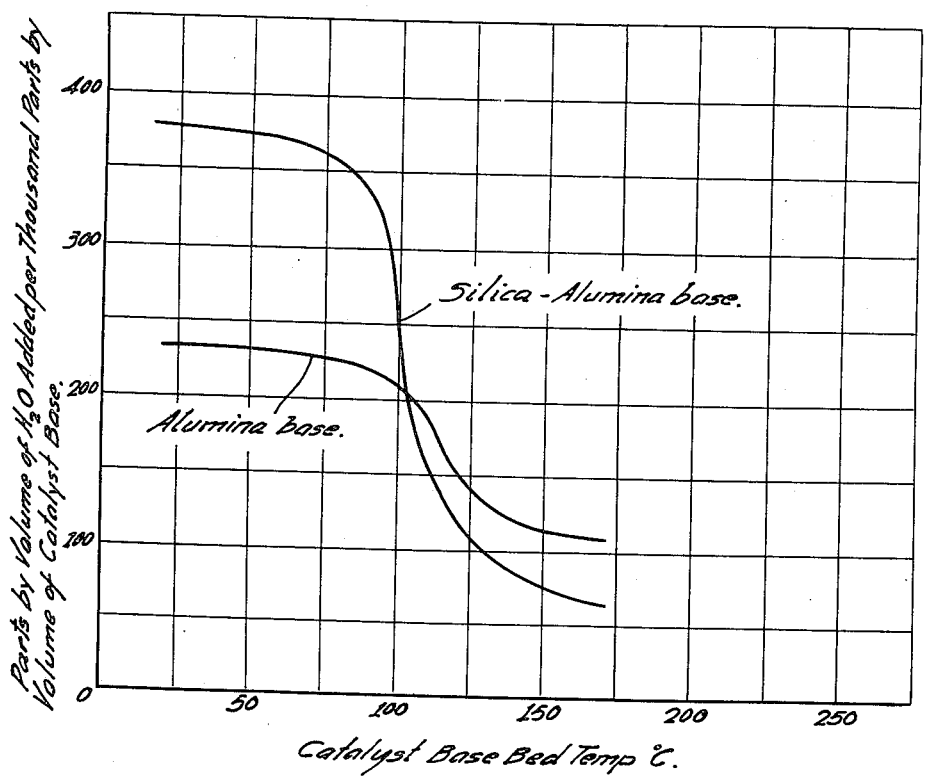

United States Patent Office 2,865,868
Patented Dec. 23, 1958

2,865,868

PROCESS FOR PREPARING IMPREGNATED COMPOSITE CATALYSTS

Joseph B. McKinley, Pittsburgh, Benjamin P. Thomas, Springdale Township, Allegheny County, and Michael J. Derrig, Verona, Pa., assignors to Gulf Research & Development Company, Pittsburgh, Pa., a corporation of Delaware Application April 4, 1952, Serial No. 280,474

7 Claims. (Cl. 252—467)

This invention relates to a process for preparing impregnated composite catalysts and for using the same.

Among the most widely used catalysts in the chemical and petroleum industries are the composite catalysts prepared by the impregnation techniques. These catalysts comprise a base or carrier composited with another material. Difficulties have arisen relative to the preparation of these types of catalysts as they often display impregnation irregularities. Since superior catalytic properties are imparted to the final product when the catalytic material is uniformly impregnated upon the surface of the base, irregularly impregnated catalysts do not have their full potential catalytic activity. This is true in cases in which the base may have little or no catalytic activity in and of itself, as well as in cases where the base contributes to the activity of the final catalyst.

Furthermore, it has generally been the practice to manufacture these composite catalysts prepared by the impregnation technique by first elutriating particles of base and then immersing the elutriated particles in a solution containing a catalyst component. The wet base particles have then been removed from the impregnating solution and dried by conventional drying techniques such as by tray drying. This practice has been found to be deficient for the preparation of large batches of impregnated composite catalyst due to the procedural operating difficulties and manufacturing equipment cost concomitant with the employment of the various manipulative steps cited above.

This invention relates to a method for readily preparing a uniformly impregnated composite catalyst. Thus, a fluidized bed of finely divided catalyst base particles is impregnated with an impregnating solution containing a catalyst component at an impregnating temperature not higher than the boiling point of the impregnating solution. The impregnated catalyst is then at least partially dried, after which the impregnation and drying may be repeated. At the conclusion of the final drying stage the impregnated catalyst may be calcined at an elevated temperature such as one of the order of about 700° to 1200° F. The drying is preferably accomplished by transferring the fluidized impregnated catalyst to a drying zone of elevated temperature, and fluid drying the impregnated catalyst in the drying zone. Alternatively, the catalyst particles may be dried by conventional drying means, as by tray or batch drying. This type of drying can be carried out in the present process without substantial migration of the impregnating solution because there will be no substantial amount of the solution unabsorbed by the pores of the support following impregnation. In the preferred embodiment of the invention aqueous impregnating solutions containing soluble salts of catalytic component metals are employed at atmospheric pressure, in which case the maximum impregnating temperature is below the boiling point of the impregnating solution such as about 5° to 98° C., and preferably about 85° to 95° C. However, nonaqueous impregnating solutions such as solutions in organic solvents like ethyl alcohol acetones, isopropyl alcohol, etc., containing soluble forms of catalytic component metals may also be employed. When using such solutions, the impregnating temperatures will of course be selected as described above and will not be above the boiling point of the impregnating solution.

The process of our invention is useful for the preparation of composite catalysts for many diverse processes known in the chemical and petroleum arts. It is especially useful for preparing impregnated composite catalysts for use in hydrogenation processes such as hydrocracking and hydrodesulfurization, but it is also useful for the preparation of other types of impregnated composite catalysts. Thus, for example, impregnated composite catalysts such as methanol synthesis catalysts comprising copper oxide and zinc oxide on alumina; catalytic cracking catalysts comprising alumina and silica; reforming catalysts such as molybdenum oxide on alumina; etc., can be prepared in accordance with the process of our invention.

As heretofore mentioned, the present process is especially useful for preparing hydrogenation catalysts, and in particular catalysts employed in the hydrocracking of petroleum hydrocarbons. In this type of hydrogenation, a petroleum hydrocarbon feed such as a high-boiling petroleum hydrocarbon stock like a total crude such as a West Texas, Kuwait, or Baxterville, Mississippi crude, a topped or reduced crude; or a high-boiling petroleum distillate fraction is contacted in the presence of a hydrogenation catalyst with a hydrogen-containing gas at relatively high temperatures such as about 750° to 950° F. under high pressures such as about 250 to 2,000 pounds per square inch or more. Superior hydrogenation catalysts include the group VIa and/or group VIII metals and compounds, either singly or in combination, supported upon a base. Thus, for example, molybdenum oxide, tungsten oxide, nickel, nickel oxide, tungsten sulfide, cobalt molybdate, etc., constitute hydrogenation catalysts when supported upon bases such as alumina, silica-alumina, silica gel, pumice, clays such as acid-activated montmorillonite clays, aluminum silicates, etc. These bases may have little or no catalytic activity in and of themselves or in some cases may contribute to the activity of the final catalyst such as in the case of a silica-alumina base. With bases derived from natural sources, it is often desirable to treat them in some manner, as for example acid leaching, to increase their surface area.

When the hydrocarbon feed contains sulfur, the feed is both hydrocracked and desulfurized upon contact with the catalyst under the hydrogenation conditions given above and the process is therefore referred to as a hydrodesulfurization process. The diminishment of the sulfur content may be effected either by absorption of the sulfur in the form of metallic sulfide upon the catalyst or by conversion of the sulfur into hydrogen sulfide.

Reference should be had to the accompanying drawings which are hereby incorporated into our application and made a part thereof. In the drawings, Figure 1 is a diagrammatic view of a form of apparatus suitable for the process of our invention.

Figure 2 is a diagrammatic view of another form of apparatus suitable for the process of our invention.

Figure 3 is a graphic representation secured by plotting the parts by volume of water added per thousand parts by volume of catalyst base against the catalyst base bed temperature.

Figure 1:
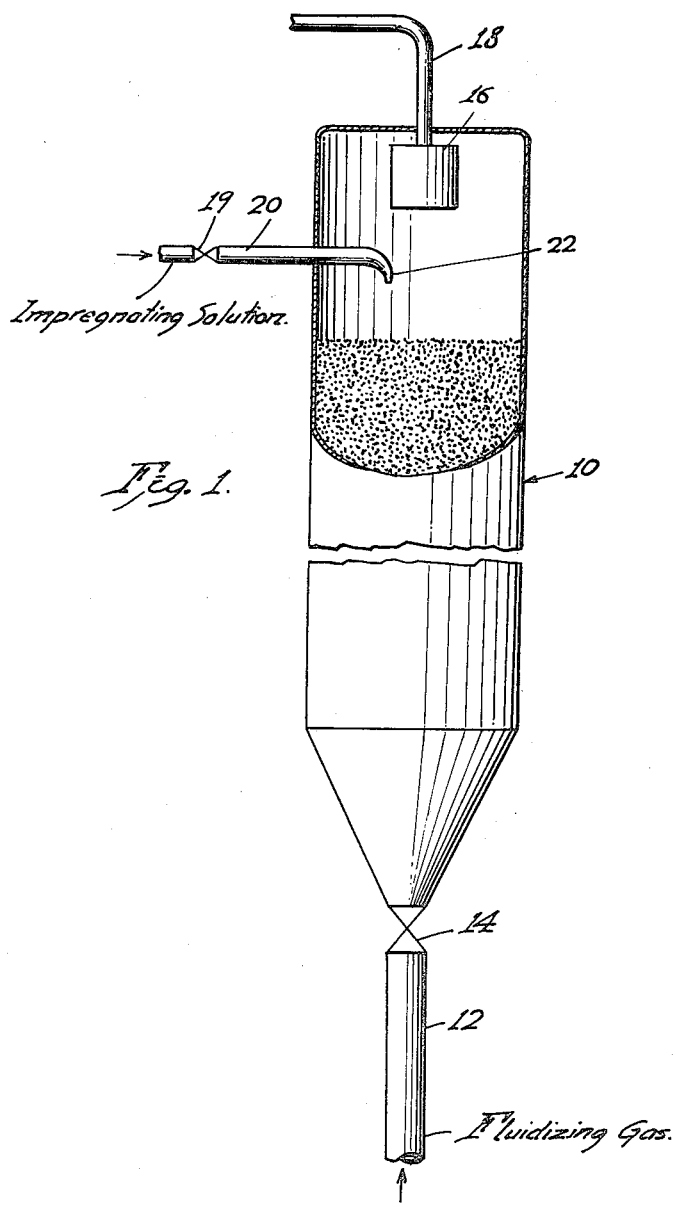

Referring to Figure 1, we shall describe our invention as applied to the preparation of a nickel oxide-tungsten oxide-silica-alumina composited hydrogenation catalyst. Vessel 10 contained a dense phase fluid bed of base particle silica-alumina microspheres. The fluid bed comprised about 1000 parts by volume (packed volume), equalling about 571 parts by weight, of base particles comprising silica-alumina microspheres containing about 88 percent by weight of silica and about 12 percent by weight of alumina. The bed was maintained fluidized and heated to an impregnation temperature of about 85° C. by a preheated inert fluidizing gas, in the instant example air, which was passed into vessel 10 through line 12 and valve 14 a at linear velocity of 0.05 foot per second. The fluidizing gas was removed from vessel 10 by means of porous glass filter 16 and line 18.

An aqueous impregnating solution which had been preheated to the impregnation temperature of 85° C. and contained a mixture of nickel nitrate and ammonium meta-tungstate having a nickel concentration of 1.38 weight percent, and a tungsten concentration of 3.56 weight percent, was introduced into vessel 10 through valve 19, line 20 and nozzle 22. Nozzle 22 was located in the dispersed phase about ½ foot above the level of the dense phase fluid bed. The impregnating solution was sprayed in the form of a spray of droplets through nozzle 22 in the dispersed or dilute phase and thence onto the dense phase fluid bed.

We have found that to achieve uniform impregnation of the impregnating solution upon the base particles, the diameter of the streams of liquid or droplets in the spray from nozzle 22 must be sufficiently small so as not to form large clumps of wetted catalyst which drop to the bottom of vessel 10 or classify in the fluid bed. In general, the smaller the diameter of the spray drop or stream, the better will be the impregnation. However, the sprayed drop or stream diameter should be sufficiently large to prevent substantial vaporization of the impregnating solution or its free transport out of vessel 10 with the fluidizing gas.

Excellent results were obtained when the impregnating solution was added in the form of droplets having a ⅟₃₂ to ⅛ inch diameter, or in the form of a liquid stream having a diameter of about 0.012 inch, at a rate of about 0.133 gallon per hour per square inch of cross-sectional area. When added as a liquid stream, as mentioned above, we observed that the stream broke up on contact with the catalyst bed to give small aggregates of wetted catalyst. Specifically, in the instant case in which the fluid droplets traversed a dispersed phase distance of about ½ foot, an addition rate of about 4 to 6 parts by volume per minute per the thousand parts by volume of catalyst base was employed, with the fluidizing gas having the afore-mentioned linear velocity of 0.05 foot per second. It was also noted that greater fluidizing gas rates, such as linear velocities up to 0.20 foot per second and more, were satisfactory and did not prevent the droplets from contacting the bed. As the rate at which the impregnating solution can be added at the top is proportional to the area of the top of the bed, it is desirable to make the diameter to length ratio of vessel 10 as large as feasible. However, a minimum depth level for the fluid bed should be maintained in order to permit the turbulent action of the fluidized base particles to erode away any small clumps which may be formed after the impregnating solution has contacted the top of the bed. Thus, under the above-mentioned conditions, satisfactory operation can be maintained with a bed depth of about 2 feet or more.

After 270 parts by volume of impregnating solution were added to the thousand parts by volume of catalyst base, the flow of impregnating solution was stopped by closing valve 19. The partially impregnated catalyst particles were then dried by elevating the temperature of the fluid bed to a temperature of the order of 125° C. by introducing heated fluidizing gas through line 12 and valve 14. The heated fluidizing gas and volatilized moisture from the fluid bed were then removed through porous glass filter 16 and line 18.

In some cases it is advisable to remove substantially all of the impregnating solution's solvent and produce dried catalyst particles, even though the particles are to be reimpregnated with additional amounts of impregnating solution. However, in most cases where further impregnation is intended, such as in the instant case, we have found it desirable to retain a significant residue of absorbed impregnating solution upon the catalyst particles so that on reimpregnation the catalyst particles are partially saturated with impregnating solution. Under these conditions, a given droplet of impregnating solution will wet a proportionally larger number of catalyst base particles. This is advantageous inasmuch as the uniformity of impregnation is partially dependent upon the number of particles affected by each given droplet of impregnating solution.

After the fluid bed had undergone the desired degree of drying, the bed temperature was again returned to the impregnation temperature of about 85° C. by the introduction of fluidizing gas of proper temperature through line 12 and valve 14. The fluid bed was then reimpregnated with an additional amount of impregnating solution from valve 19, line 20 and nozzle 22 until a total of about 541 parts by volume of impregnating solution, including the 270 parts initially added, were absorbed by the thousand parts by volume of catalyst base. This constituted an addition to the catalyst base of about 584 parts by weight of impregnating solution. After this impregnation level had been attained, the doubly impregnated catalyst particles were dried at 125° C. by the introduction of heated fluidizing gas through line 12 and valve 14 and substantially all of the absorbed moisture was removed. The dried catalyst particles were removed from vessel 10 through valve 14 and line 12 and calcined (in external equipment, not shown) at 1000° F. for about 16 hours.

The catalyst prepared above contained 1.26 weight percent of nickel and 3.29 weight percent of tungsten (by polarographic quantitative analysis) with the mol ratio of nickel to tungsten being 1.20:1. The hydrocracking properties of this catalyst were compared with a hydrogenation catalyst prepared by one of the best prior art methods of catalyst impregnation. Thus, 559 parts by weight of silica-alumina catalyst base were evacuated and contacted with an excess of a solution similar to that employed for the preparation of the aforementioned catalyst, so that the catalyst base was completely covered. The excess impregnating solution was drained from the impregnated catalyst. The catalyst was then tray dried for 24 hours at 125° C. Following the drying, the catalyst was calcined at about 1000° F. for about 16 hours. This technique yielded a catalyst having substantially the same composition as that obtained by the fluid impregnation technique.

The catalysts were tested for activity in the destructive hydrogenation of a West Texas crude. The inspection of this crude was as follows:

| | |
|---|---|
| ° API | 34.8 |
| Sp. gr. at 60°/60° F | 0.8509 |
| Aniline point, ° C | 71.6 |
| Bromine No.[1] | 5.0 |
| Lamp sulfur, percent | 1.36 |
| Conradson carbon residue, percent[2] | 5.20 |
| ASTM D-158 distillation: | |
|     IBP, ° F | 122 |
|     Percent at 392° F | 31.1 |
|     Percent at 500° F | 43.4 |
|     Percent at 590° F | 55.5 |

[1] Obtained on 590° F. end point distillate.
[2] Obtained on 590° F. bottoms.

This crude was destructively hydrogenated at a temperature of about 862° F., a pressure of about 500 pounds per square inch gauge, and a liquid volume hourly space velocity of 0.84 based on settled catalyst using 10,000 standard cubic feet of hydrogen per barrel of crude. The destructive hydrogenation system was brought to equilibrium by passing crude through the system under the afore-mentioned destructive hydrogenation conditions for a total throughput of 0.2 volume of oil per volume of catalyst. The on-stream run was then performed, the throughput being 2.5. Before reaction, the catalyst was dried for one hour at 150° C. and then for 9 hours at 850° F. at atmospheric pressure with a stream of air at a space velocity of 110 volumes of air measured at standard temperature and pressure per settled volume of catalyst per hour. The reactor was then purged with nitrogen and the catalyst reduced at 850° F. and atmospheric pressure for 7½ hours with a stream of hydrogen having a standard temperature and pressure space velocity of 400. The unit was then pressured, and the hydrogen stream calibrated at the desired run rate for five minutes. After completion of the off-stream and on-stream run periods, the unit was depressured and purged with nitrogen. The catalyst was then regenerated with air at a temperature in the neighborhood of 1000° F., purged with nitrogen, and reduced in the same manner as before. The catalyst was then reused for treatment of additional feed in additional cycles.

The catalyst prepared by the process of the instant invention yielded a product having a considerably lower Conradson carbon residue on the 590° F. bottoms product fraction, namely, of the order of less than half that of the catalyst prepared by the vacuum impregnation technique. Thus, the Conradson carbon residue when the catalyst prepared by the process of our invention was used, was 0.70 for the third hydrogenation cycle, as compared with a Conradson carbon residue of 1.78 for the third hydrogenation cycle when the hydrogenation catalyst prepared by the vacuum impregnation technique was utilized. This indicates that the catalyst prepared by the process of our invention was more active for the hydrocracking of the high-boiling asphaltic feed constituents. Moreover, the yield of the liquid product was somewhat greater when the catalyst prepared by the process of our invention was employed. The bottoms product fraction having a lower Conradson carbon residue is of greater utility as a catalytic cracking charge stock.

If the preparation of large quantities of impregnated catalyst is required, it is desirable to have a continuous method for manufacturing these catalysts, rather than the batch method set forth above. Under these circumstances resort should be had to the system set forth in Figure 2. Referring to this figure, impregnating solution which had been preheated to the impregnation temperature of about 85° to 95° C. is introduced to the system through pipe 30, valve 32 and sprayer 34. Sprayer 34 is located in the dispersed phase about ½ foot above the level of the dense phase fluid bed of catalyst base particles in fluid impregnator 36. The level of the fluid bed in fluid impregnator 36 is maintained constant by line 38. The temperature of the fluid bed is the same as that of the impregnating solution; namely, about 85° to 95° C. Impregnated particles are continuously withdrawn from fluid impregnator 36 through pipe 40 and valve 42 into collecting chamber 44. Simultaneously, fluidized base particles are continuously added to the fluid bed of base particles within fluid impregnator 36 through line 46, valve 48 and line 50. The fluid bed within fluid impregnator 36 is maintained fluidized and at impregnation temperature through the addition of preheated fluidizing gas, such as air, from lines 52 and 54. The fluidizing gas is continuously withdrawn through cyclone separator 56 which returns any entrained base particles to the fluid bed. From cyclone separator 56, the fluidizing gas leaves the system through line 58.

The impregnated catalyst particles in collecting chamber 44 are aerated through the introduction of gas such as air from lines 60, 62 and 64, valve 66 and line 68. From collecting chamber 44 the impregnated catalyst particles are removed through pipe 70 and valve 72. From valve 72 the impregnated particles are conveyed to fluid drier 74 through line 77 in a stream of gas entering through line 60 and valve 61. In the instant case fluid drier 74 is considerably smaller than fluid impregnator 36, and has a volume capacity about 25 percent the volume of fluid impregnator 36. Within fluid drier 74, a dense phase fluid bed is maintained at a drying temperature of the order of 125° C. by the addition of hot fluidizing gas such as air through line 76. The fluidizing gas and volatilized moisture are removed from fluid drier 74 through cyclone separator 78, which returns entrained catalyst particles to the fluid bed within fluid drier 74. From cyclone separator 78, the fluidizing gas and volatilized moisture are removed from the system by line 80. The dried impregnated catalyst particles are continuously removed from fluid drier 74 through line 82, valve 84 and line 86. The bulk of the dry catalyst, however, may be continuously recirculated to impregnator 36 through line 88, cooler 90, and valve 92. Fluidizing gas entering through line 52 picks up catalyst exiting from valve 92 and the gas-dry catalyst mixture is transported into impregnator 36. The temperature of the catalyst and the fluidizing gas is adjusted so that the mixture does not increase the temperature of the catalyst in the impregnator above about 85° to 95° C.

The reason for having the drying chamber small in comparison to the impregnator is to insure that a large proportion of the particles always have a chance to be contacted with impregnating solution and to increase the chance for impregnating any given particle. This is also accomplished by maintaining a rapid circulation of catalyst between impregnator and drier. Fresh catalyst base addition to the impregnator and finished catalyst withdrawal from the drier are at equal volume rates and the rate is slow with respect to the rate of catalyst circulation. By properly adjusting the rates of impregnating solution addition, of catalyst base addition, and finished catalyst withdrawal, any level of impregnant deposition on the base can be obtained using an impregnating solution containing a given concentration of impregnant.

If the use of a batch process is desirable the system described by Figure 2 can be filled with catalyst base and operated as described above without continuous base addition and catalyst withdrawal until the desired level of impregnant is deposited on the base. The addition of impregnating solution is then stopped and the temperature in the impregnator is increased to speed up the final drying process.

It has been discovered that when impregnating fluidized catalyst base particles at impregnation temperatures in excess of the impregnating solution's boiling point, uniform impregnation of the catalyst particles is extremely difficult to achieve. It has been found that large numbers of wet clumps of catalyst are formed at elevated impregnation temperatures by the cohesive agglomeration of catalyst particles and impregnating solution droplets. These clumps fall through the fluid bed and collect at the bottom of the fluid impregnator. This is apparently caused by the volatilized solvent vapor shielding of the little clumps of particles initially formed when the droplets are contacted with catalyst particles. Thus, at high temperatures the volatilized solvent vapors from the impregnating solution are evolved rapidly and prevent the catalyst clumps from contacting dry fluidized particles which would otherwise erode the clumps away. Moreover, the rapid vaporization of the impregnating solution produces extreme turbulence in the catalyst bed.

Experiments were conducted to determine the amount of water (preheated to a temperature of 85° C.) which could be added as a solid stream through a 0.012 inch orifice to a silica-alumina cracking base or alumina base before noticeable bed classification was in evidence. The results of these experiments were plotted as parts by volume of added water per thousand parts by volume of catalyst base before clumping vs. the catalyst base bed temperature and produced the curves shown in Figure 3. As shown by the curves, both silica-alumina and alumina, exhibit a marked change in slope in the region from about 85° C. to about 125° C. Furthermore, hydrogenation catalysts prepared at elevated impregnation temperatures such as of the order of 450° C., possessed a lower activity when employed for the destructive hydrogenation of West Texas crude as determined by the recovery yield, and also a higher specific gravity of liquid product than comparable catalysts prepared in accordance with the instant invention.

While the foregoing description of our process constitutes a preferred operating procedure, it is obvious that our process may be modified by one skilled in the art. It is understood that these modifications constitute a part of our invention and are to be considered as included within the appended claims. By way of example, other droplet and stream diameters, dispersed phase distances, and process variables than those heretofore mentioned may be employed in accordance with the process of the instant invention.

Thus, for example, while the preferred drying temperature range for aqueous impregnating solutions is below about 150° C., other drying temperatures can be employed. Moreover, in some cases it is advantageous to add the solution at such a rate that equilibrium is attained between the rate of solution introduction and the rate of drying with the result that the solvent is volatilized and removed as rapidly as the impregnating solution is added. In addition, the utilization of any specific number of impregnation-drying cycles with the same or a different impregnating solution in any given case falls within the skill of one skilled in the art, and may readily be determined by the operator after a few trial runs. Moreover, the addition of further processing equipment and the modification of our continuous and batchwise modes of operation are to be considered as part of our invention and included within the appended claims.

The uniformity of the catalyst impregnation can sometimes be improved further through the employment of dilute impregnating solutions. Inasmuch as a larger amount of dilute solution must, of necessity, be required to deposit a given amount of impregnant on the catalyst base particles there is less chance for a given catalyst base particle to escape impregnation when this procedure is used. The larger volumes of impregnating solution required, however, tend to make this procedure somewhat slower than the use of more concentrated impregnating solutions. This in turn can be offset by employing a larger number of smaller diameter streams of impregnating solution which will permit a faster rate of impregnant addition. Thus, a fine spray may be advantageously utilized so long as the size of the spray droplets is sufficient to avoid free transport of the droplets upward in the impregnation chamber.

In some cases it is advisable to add the impregnating solution directly into the dense phase of the fluid bed rather than into the dispersed phase above the bed. This can advantageously be accomplished through the use of nozzles located within the fluid bed, as shown in accompanying Figure 2. Thus, impregnating solution passes from line 30 through line 94, valve 96, line 98 into line 100 and/or line 102 and then into respective nozzles 104 and 106 from which the impregnating solution enters the dense phase bed. Gas, such as air, passes upwardly from line 60 through line 62, valve 108, line 110 into line 112 and/or line 114 which enclose respective nozzles 104 and 106. Nozzles 104 and 106 are arranged within respective lines 112 and 114 in such a manner that the spray feed droplets exiting from the nozzle do not impinge on the inside of the line and its flared terminal end. The flow of gas through lines 112 and 114 displaces fluid bed catalyst particles away from the tip of the nozzle and prevents catalyst agglomeration around the nozzle orifice. The nozzles may be spaced in various sections of the fluid bed to ensure uniform impregnant distribution. It is to be understood that the arrangement shown in Figure 2 is only one suitable embodiment and that a larger or smaller number of nozzles, depending upon the size and nature of the fluid bed, may be employed. Furthermore, other forms of nozzles may be utilized although those shown in Figure 2 constitute a preferred form. The introduction of impregnating solution directly into the dense phase of the fluid bed has the advantage of permitting smaller diameter-to-length ratios for the fluid impregnator. Moreover, the possibility of loss of impregnating solution droplets through free transport upward in the bed is almost eliminated. In some cases, it is advisable to introduce impregnating solution from a distributor above the fluid bed simultaneously with the introduction of solution through nozzles located within the dense phase of the bed. This permits a rapid impregnation.

The utilization of our invention permits the manufacture of uniformly impregnated composite catalysts. When hydrogenation catalysts are prepared in accordance with our invention, the catalysts possess greater activity for the hydrogenation of the high-boiling asphaltic constituents of petroleum feeds. Moreover, the impregnation of catalyst base through the application of our invention effects a facile and rapid impregnation-drying technique achieved through the use of relatively small and inexpensive processing equipment. In addition, the elutriation step required of most fluid supports prior to their on-stream impregnation may be accomplished in the impregnating equipment with minor modifications eliminating the need for additional elutriation equipment.

We claim:

1. A process for preparing a uniformly impregnated composite catalyst which comprises maintaining in an impregnation zone a dense phase fluidized bed of finely divided catalyst base particles superimposed by a dispersed phase of said catalyst base particles, spraying into said catalyst base particles an impregnating solution containing a catalyst component at an impregnation temperature below the boiling point of the impregnation solution, whereby agglomeration of said catalyst base particles is avoided, the size of said spray being sufficiently large to prevent free transport of the impregnation solution upwardly in said impregnation zone and sufficiently small to prevent the formation of large clumps of wetted catalyst base particles which drop to the bottom of said impregnation zone, and then at least partially drying the thus impregnated catalyst.

2. The process of claim 1, wherein the impregnation and drying steps are repeated after the initial drying of the impregnated catalyst.

3. The process of claim 1, wherein the impregnating solution is sprayed into the dispersed phase of said catalyst base particles.

4. The process of claim 1, wherein the impregnating solution is sprayed into the dense phase of said catalyst base particles.

5. The process of claim 1, wherein the impregnating solution is an aqueous solution containing a soluble salt of a metal selected from the class consisting of the group VIa and group VIII metals.

6. The process of claim 1, wherein the impregnating solution is an aqueous solution containing a catalyst component and the impregnation temperature ranges from about 85° to 95° C.

7. The process of claim 6, wherein said drying is accomplished by transferring said impregnated catalyst to a drying zone where it is fluidized, said drying zone having a drying temperature below about 150° C.

References Cited in the file of this patent

UNITED STATES PATENTS

| | | |
|---|---|---|
| 2,423,833 | Hirsch | July 15, 1947 |
| 2,424,467 | Johnson | July 22, 1947 |
| 2,459,465 | Smith | Jan. 18, 1949 |
| 2,490,975 | Mathy | Dec. 13, 1949 |
| 2,533,071 | Vesterdal et al. | Dec. 5, 1950 |
| 2,614,066 | Cornell | Oct. 14, 1952 |